(12) United States Patent
Wu

(10) Patent No.: US 11,057,803 B2
(45) Date of Patent: Jul. 6, 2021

(54) METHOD AND DEVICE OF HANDLING MOBILITY TO A NR STANDALONE NETWORK

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/245,218

(22) Filed: Jan. 10, 2019

(65) Prior Publication Data

US 2019/0215740 A1    Jul. 11, 2019

Related U.S. Application Data

(60) Provisional application No. 62/627,772, filed on Feb. 8, 2018, provisional application No. 62/616,387, filed on Jan. 11, 2018.

(51) Int. Cl.
| | |
|---|---|
| *H04W 72/04* | (2009.01) |
| *H04W 36/00* | (2009.01) |
| *H04W 48/10* | (2009.01) |
| *H04W 76/27* | (2018.01) |
| *H04W 8/24* | (2009.01) |
| *H04W 76/15* | (2018.01) |
| *H04W 36/14* | (2009.01) |

(Continued)

(52) U.S. Cl.
CPC ......... *H04W 36/0077* (2013.01); *H04W 8/24* (2013.01); *H04W 36/0055* (2013.01); *H04W 36/0066* (2013.01); *H04W 36/0069* (2018.08); *H04W 48/10* (2013.01); *H04W 76/15* (2018.02); *H04W 76/27* (2018.02); *H04W 36/14* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | |
|---|---|---|
| 2017/0374607 A1 | 12/2017 | Wu |
| 2018/0343697 A1 | 11/2018 | Hsu |
| 2019/0132896 A1 | 5/2019 | Kusashima |

FOREIGN PATENT DOCUMENTS

| | | |
|---|---|---|
| CN | 108391322 A | 8/2018 |
| CN | 108632923 A | 10/2018 |

(Continued)

OTHER PUBLICATIONS

Search Report dated May 28, 2019 for EP application No. 19151516.2, pp. 1-7.

(Continued)

*Primary Examiner* — Willie J Daniel, Jr.
(74) *Attorney, Agent, or Firm* — Winston Hsu

(57) ABSTRACT

A communication device for transmitting capabilities for mobility to a network supporting a standalone mode of a first radio access technology (RAT), comprises at least one storage device; and at least one processing circuit, coupled to the at least one storage device. The at least one storage device stores, and the at least one processing circuit is configured to execute instructions of: the communication device transmitting a first capability of the first RAT and a second capability of the first RAT to a first base station (BS) of a second RAT via the second RAT, wherein the first capability indicates a support of a standalone mode of the first RAT and the second capability indicates a plurality of supported bands of the first RAT.

12 Claims, 6 Drawing Sheets

(51) Int. Cl.
   *H04W 48/18* (2009.01)
   *H04W 88/06* (2009.01)

(56) References Cited

FOREIGN PATENT DOCUMENTS

| | | | |
|---|---|---|---|
| CN | 108696881 A | 10/2018 | |
| CN | 108924961 A | 11/2018 | |
| WO | 2017/195463 A1 | 11/2017 | |
| WO | 2018/083230 A1 | 5/2018 | |
| WO | 2018/083585 A1 | 5/2018 | |

OTHER PUBLICATIONS

Huawei, HiSilicon, "Capability design for LTE NR DC", 3GPP TSG-RAN WG2 NR Ad Hoc, R2-1707425, Jun. 27-29, 2017, Qingdao, China, XP051301914, pp. 1-2.
Ericsson, "UE capability coordination for LTE-NR interworking", 3GPP TSG-RAN WG2 Meeting #99, Tdoc R2-1708032, Aug. 21-25, 2017, Berlin, Germany, XP051317942, pp. 1-9.
ZTE Corporation, "Consideration on the Index based Capability Coordination procedure", 3GPP TSG-RAN WG2 Meeting #99, R2-1708129, Aug. 21-25, 2017, Berlin, Germany, XP051318032, pp. 1-5.
Search Report dated Feb. 21, 2019 for EP application No. 19151516. 2, pp. 1-18.
3GPP TS 38.331 V15.0.0, Dec. 2017.
3GPP TS 36.331 V15.0.1, Jan. 2018.
3GPP TS 37.340 V15.0.0, Dec. 2017.
Office action dated Oct. 26, 2020 for the China application No. 201910028192.X, filed Jan. 11, 2019, pp. 1-11.
Office action dated Sep. 25, 2020 for EP application No. 19151516. 2, pp. 1-8.

US 11,057,803 B2

METHOD AND DEVICE OF HANDLING MOBILITY TO A NR STANDALONE NETWORK

CROSS REFERENCE TO RELATED APPLICATIONS

This application claims the benefit of U.S. Provisional Application No. 62/616,387 filed on Jan. 11, 2018 and U.S. Provisional Application No. 62/627,772 filed on Feb. 8, 2018, which are incorporated herein by reference.

BACKGROUND OF THE INVENTION

1. Field of the Invention

The present invention relates to a communication device and a method used in a wireless communication system, and more particularly, to a communication device and a method of handling mobility to a new Radio (NR) standalone Network from a network different from the NR.

2. Description of the Prior Art

3rd Generation Partnership Project (3GPP) is discussing a fifth generation (5G) communication technology which is named as new Radio (NR). The NR has a non-standalone mode and a standalone mode. In the non-standalone mode (e.g., multi-RAT dual connectivity (MR-DC)), both a UE capable of the non-standalone mode and a NR base station capable of the non-standalone mode are connected via a long-term evolution (LTE) assistance. Operations of the non-standalone mode (or called the MR-DC) is defined in 3GPP documents. However, a UE supporting the MR-DC can only connect to a 5G cell via the assistance of the LTE, but the UE supporting the MR-DC may not support the standalone mode. Thus, the connections of the UE for the modes is an important problem to be solved.

SUMMARY OF THE INVENTION

A communication device for transmitting capabilities for mobility to a network supporting a standalone mode of a first radio access technology (RAT), comprises at least one storage device; and at least one processing circuit, coupled to the at least one storage device. The at least one storage device stores, and the at least one processing circuit is configured to execute instructions of: the communication device transmitting a first capability of the first RAT and a second capability of the first RAT to a first base station (BS) of a second RAT via the second RAT, wherein the first capability indicates a support of a standalone mode of the first RAT and the second capability indicates a plurality of supported bands of the first RAT.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
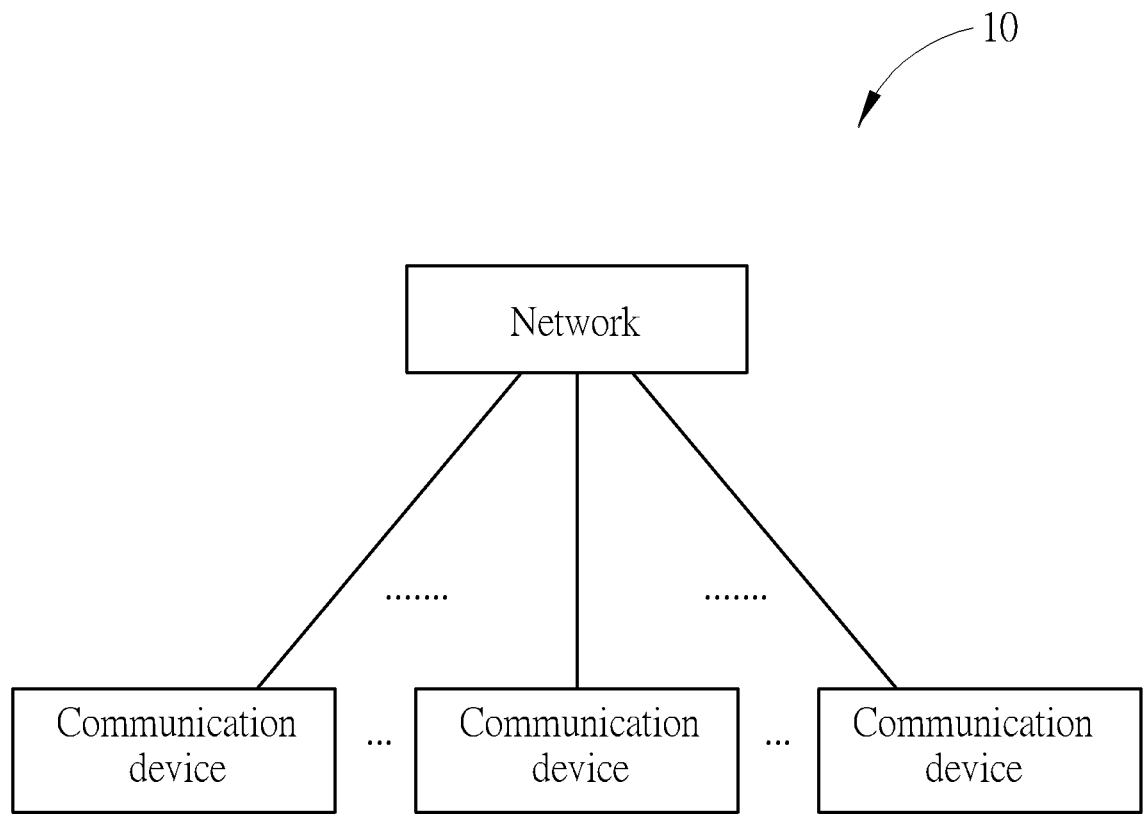
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers in the same or different duplexing modes (e.g., frequency-division duplexing (FDD), time-division duplexing (TDD) or flexible duplexing).

In FIG. 1, the network and the communication devices are simply utilized for illustrating the structure of the wireless communication system 10. The network includes at least one of a Universal Terrestrial Radio Access Network (UTRAN), an evolved UTRAN and a new Radio (NR) radio access network (RAN). The UTRAN includes at least one of a radio network controller (RNC) and Node-B (s). The E-UTRAN includes at least one evolved Node-B (eNB) which may connect to at least one of an evolved packet core (EPC) and a fifth generation core (5GC). The NR RAN includes at least one 5G base station (BS) (or called gNB) which connects to a 5GC.

A communication device may be a UE, a mobile phone, a laptop, a tablet computer, an electronic book, a portable computer system, a vehicle, a ship or an aircraft. In addition, the network and the communication device can be seen as a transmitter or a receiver according to direction (e.g., transmission direction), e.g., for an uplink (UL), the communication device is the transmitter and the network is the receiver, and for a downlink (DL), the network is the transmitter and the communication device is the receiver.

Figure 2:
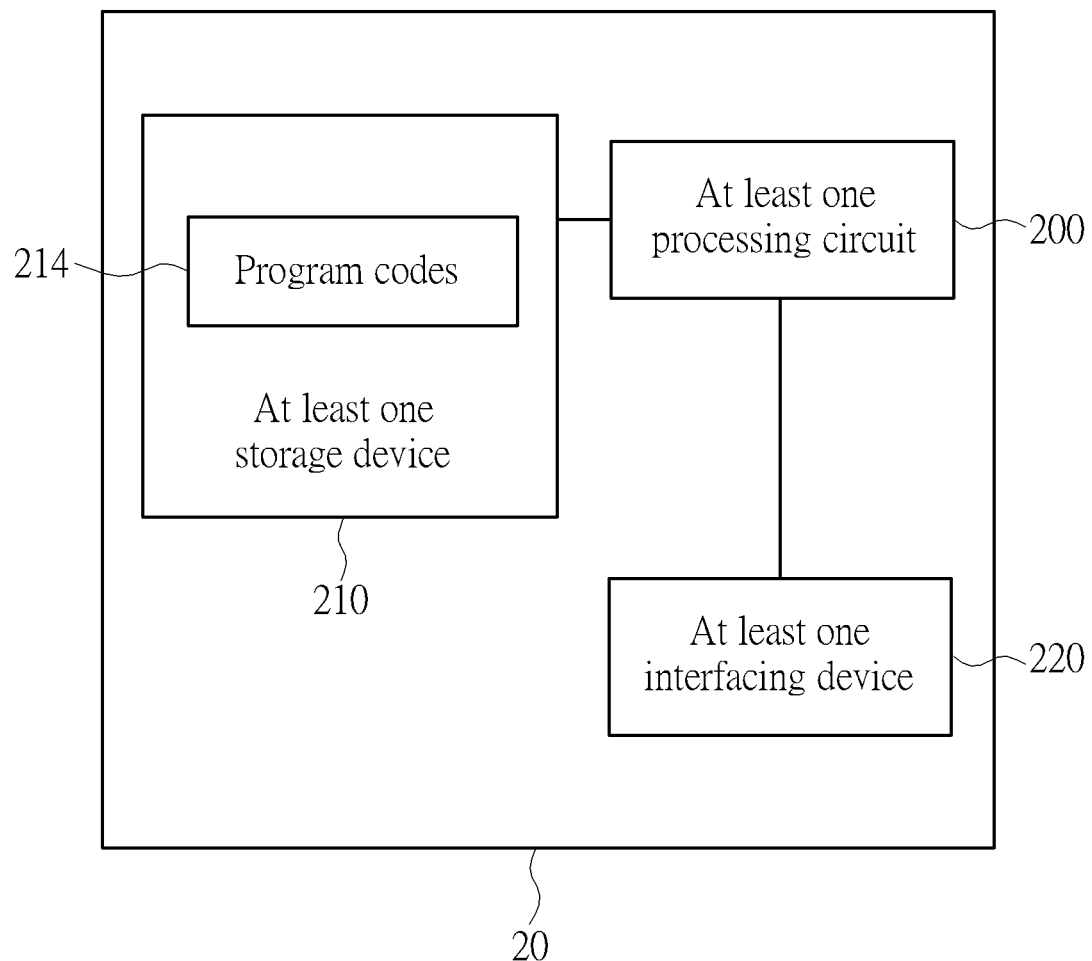
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 of which may be a microprocessor or an Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver transmitting and receiving signals (e.g., data, messages and/or packets) according to processing results of the at least one processing circuit 200.

In the following examples, a UE is used for representing the communication device in FIG. 1, to simplify the illustration of the examples.

Figure 3:
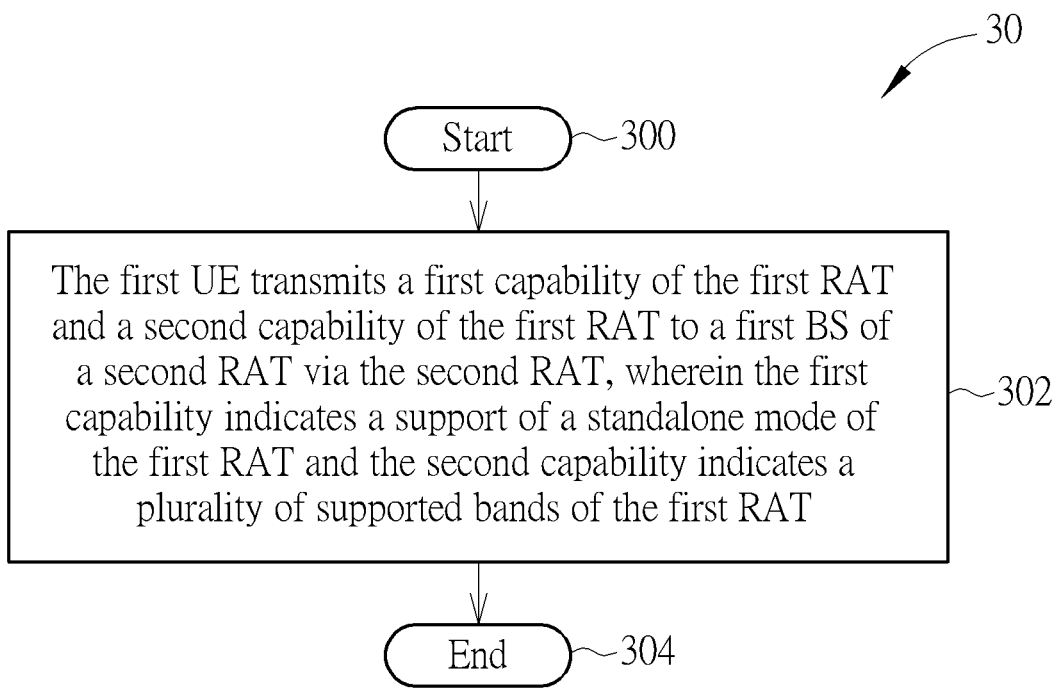
FIG. 3 is a flowchart of a process according to an example of the present invention.

A process 30 in FIG. 3 is utilized in a first UE for transmitting capabilities for mobility to a network supporting a standalone mode of a first radio access technology (RAT), and includes the following steps:

Step 300: Start.

Step 302: The first UE transmits a first capability of the first RAT and a second capability of the first RAT to a first BS of a second RAT via the second RAT, wherein the first capability indicates a support of a standalone mode of the first RAT and the second capability indicates a plurality of supported bands of the first RAT.

Step 304: End.

In one example, the first RAT is a NR, and the second RAT is an evolved Universal Terrestrial Radio Access (EU-TRA). The first BS may be an eNB.

In one example, the first RAT is the NR, and the second RAT is a Universal Terrestrial Radio Access (UTRA). The first BS may be a Radio Network Controller or a Node-B.

In one example, the first UE transmits a third capability of the first RAT to the first BS of the second RAT, wherein the third capability indicates the first UE is capable of dual connectivity (DC) of the first RAT and the second RAT (e.g., EUTRA-NR DC (EN-DC)). If the first UE does not support the DC of the second RAT and the first RAT, the first UE does not transmit the third capability to the first BS.

In one example, the first BS transmits a measurement configuration to the first UE, wherein the measurement configuration configures the first UE to measure a carrier frequency of the first RAT. The carrier frequency is in a band of the plurality of supported bands. The first UE may transmit a measurement result of the carrier frequency, e.g., in a Measurement Report message, to the first BS, after measuring the carrier frequency. In one example, the first BS transmits the first UE a Radio Resource Control (RRC) Connection Reconfiguration message including the measurement configuration.

In one example, the first BS determines to hand over the first UE to a second BS of the first RAT (e.g., gNB) according to (or in response to) the first capability. That is, the first BS determines to do so if the first BS receives the first capability of the first UE. The first BS transmits a handover command message (e.g., a RRC Reconfiguration message of the first RAT) to the first UE in response to the determination, wherein the handover command orders the first UE to hand over to the second BS. In one example, the first BS includes the handover command in a RRC message of the second RAT (e.g., a MobilityFromEUTRACommand message).

In one example, the first BS transmits a first Handover Request message to the second BS, in response to the determination. The second BS transmits a first Handover Request Acknowledge message responding to the first Handover Request message to the first BS. The first Handover Request Acknowledge message includes the handover command message generated by the second BS.

In one example, the first BS transmits a Handover Required message to a first core network (CN), in response to the determination. The first CN transmits a Relocation Request message to a second CN in response to the Handover Required message. The second CN transmits a second Handover Request message to the second BS when receiving the Relocation Request message from the first CN. The second BS transmits a second Handover Request Acknowledge message in response to the second Handover Request message to the second CN. The second Handover Request Acknowledge message includes the handover command message generated by the second BS. The second CN transmits a Relocation Confirm message including the handover command message to the first CN in response to the Relocation Request message. When receiving the Relocation Confirm message, the first CN transmits a Handover Command message including the handover command in response to the Handover Required message. It should be noted that the "Handover Command (an interface message)" is different from the "handover command (an RRC message)". If the first CN and the second CN are collocated, the messages exchange between the first CN and the second CN may or may not be needed.

In one example, the first BS transmits the handover command to the first UE via the second RAT. In one example, the handover command indicates a carrier frequency of the second BS (or a cell of the first RAT) to which the first UE is handed over. The carrier frequency is in a band of the plurality of supported bands. In one example, the handover command indicates a cell of the second BS (or the cell of the first RAT) to which the first UE is handed over. The first UE performs a handover to at least one of the carrier frequency and the cell of the second BS according to the handover command.

In one example, the first BS determines whether to hand over the first UE according to a measurement result received from the first UE and the first capability for the first UE. The first BS determines to hand over the first UE to the carrier frequency or the cell of the second BS, if the measurement result indicates that a signal strength or a signal quality of the at least one of the carrier frequency and the cell of the second BS is good (e.g., above a threshold).

In one example, a second UE does not transmit the first capability of the first RAT, and transmits the second capability of the first RAT to the first BS via the second RAT. The second UE may also transmit the third capability of the first RAT to the first BS. The first BS never determines to hand over the second UE to a BS of the first RAT (i.e., the second BS or other BS(s) of the first RAT), when the first BS does not receive the first capability for the second UE.

In one example, the first BS determines to redirect the first UE to the first RAT or the second BS of the first RAT according to (or in response to) the first capability. To redirect the first UE, the first BS transmits a redirection command via the second RAT (e.g., a RRC Connection Release message) to the first UE. The redirection command indicates at least one of the first RAT, the carrier frequency of the second BS (or a carrier frequency of the first RAT) and the cell of the second BS (or a cell of the first RAT). In response to the redirection command, the first UE disconnects from the first BS. The first UE selects a cell of the first RAT according to the redirection command. The cell of the first RAT may be the cell indicated in the redirection command or on the carrier frequency of the first RAT indicated in the redirection command. The cell of the first RAT may be at the carrier frequency indicated in the redirection command.

In one example, the first BS (determines to) hands over or redirects a third UE to a third BS of the first RAT according to whether the first BS receives the first capability for the third UE. The third UE may be the first UE, the second UE or a UE different from the first UE and the second UE. The third BS may be the second BS or a BS different from the second BS. The first BS may (determine to) hand over or redirect the third UE to the second BS according to a measurement result received from the third UE and the first capability for the third UE, wherein the measurement result indicates at least one of the cell of the second BS and the carrier frequency of the second BS (or a cell of the first RAT) has a good signal strength or a good signal quality.

In one example, the first BS receives the capabilities described above from a fourth BS of the second RAT or from the first CN instead of the first UE.

Figure 4:
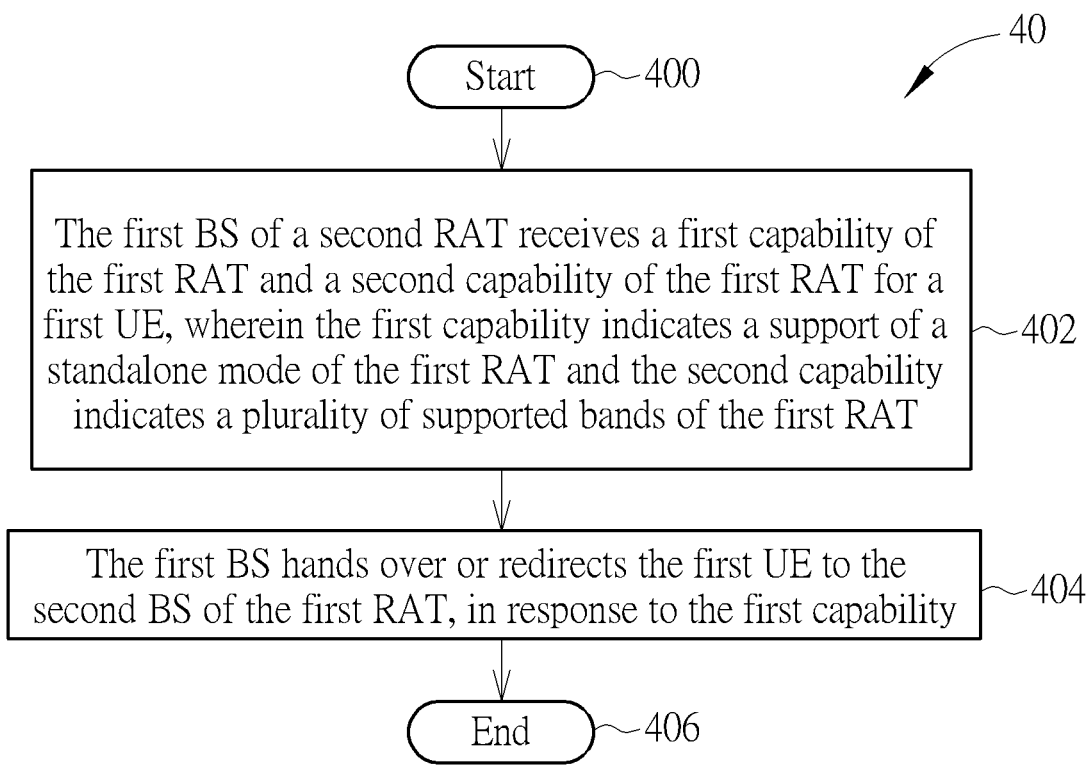
FIG. 4 is a flowchart of a process according to an example of the present invention.

A process 40 in FIG. 4 is utilized in a first BS (e.g., in the network in FIG. 1) for handling mobility to a second BS of a first RAT, and includes the following steps:

Step 400: Start.

Step 402: The first BS of a second RAT receives a first capability of the first RAT and a second capability of the first RAT for a first UE, wherein the first capability indicates a support of a standalone mode of the first RAT and the second capability indicates a plurality of supported bands of the first RAT.

Step 404: The first BS hands over or redirects the first UE to the second BS of the first RAT, in response to the first capability.

Step 406: End.

In one example, the first BS of the second RAT receives the first capability of the first RAT and the second capability of the first RAT for the first UE from the first UE, a third BS or a first CN. The third BS may be the second BS of the first RAT or a BS different from the second BS.

Description for the process 30 may be applied to the process 40, and is not repeated herein.

In one example, the first BS receives the second capability for a second UE, and does not receive the first capability for the second UE. The first BS neither hands over nor redirects the second UE to the third BS of the first RAT, according to (or in response to) the first capability. The third BS may be the second BS of the first RAT or a different BS from the second BS.

The following may be applied to the processes 30-40.

In one example, the first UE (or the second UE) includes at least one of the first capability, the second capability and the third capability in a same message or different messages of the second RAT transmitted to the first BS of the second RAT. The same message may be a RRC Connection Setup Complete message or a UE Capability Information message. The different messages may include at least one of a RRC Connection Request message, the RRC Connection Setup Complete message and UE Capability Information messages.

In one example, the first UE or the second UE includes at least one of the first capability, the second capability and the third capability in a same UE-EUTRA-Capability information element (IE) or different UE-EUTRA-Capability IEs transmitted to the first BS of the second RAT.

In one example, the first capability explicitly indicates a support of the standalone mode of the first RAT. In one example, the first capability implicitly indicates a support of the standalone mode of the first RAT. For example, the first capability may be a capability indicating a support of a feature specifically defined for the standalone mode of the first RAT. Thus, the first BS knows that the first UE supports the standalone mode of the first RAT according to the capability.

In one example, to support the standalone mode, both the first UE and the second BS capable of the standalone mode are connected directly without simultaneously connecting to the third BS of the first RAT. The third BS may be the second BS of the first RAT or a BS different from the second BS. A BS (e.g., the second BS or the third BS) capable of the standalone mode broadcasts system information for a cell selection or a cell reselection in a cell of the first RAT. The first UE may be capable of camping on the cell of the first RAT, when the first UE is in an idle mode.

In one example, the first BS is a master BS. The first BS may broadcast Non-Access Stratum (NAS) mobility information in the system information. The NAS mobility information may include at least one of a public land mobile network (PLMN) identity, a tracking area code and a cell identity.

In one example, the system information includes a master information block (MIB) and at least one system information block (SIB). For example, the at least one SIB may include SIB type 1 (SIB1). In addition to the SIB1, the at least one SIB may further include SIB type 2 (SIB2).

In one example, the first CN includes at least one mobility management entity (MME), a serving gateway and a packet data network gateway. The first CN may include at least one mobile switch center (MSC), at least one Serving General Packet Radio Service (GPRS) Support Node (SGSN) and at least one Gateway GPRS Support Node (GGSN). The second CN may include an Accessible and Mobility Management Function (AMF), a Session Management Function (SMF) and a User plane Function (UPF).

Figure 5:
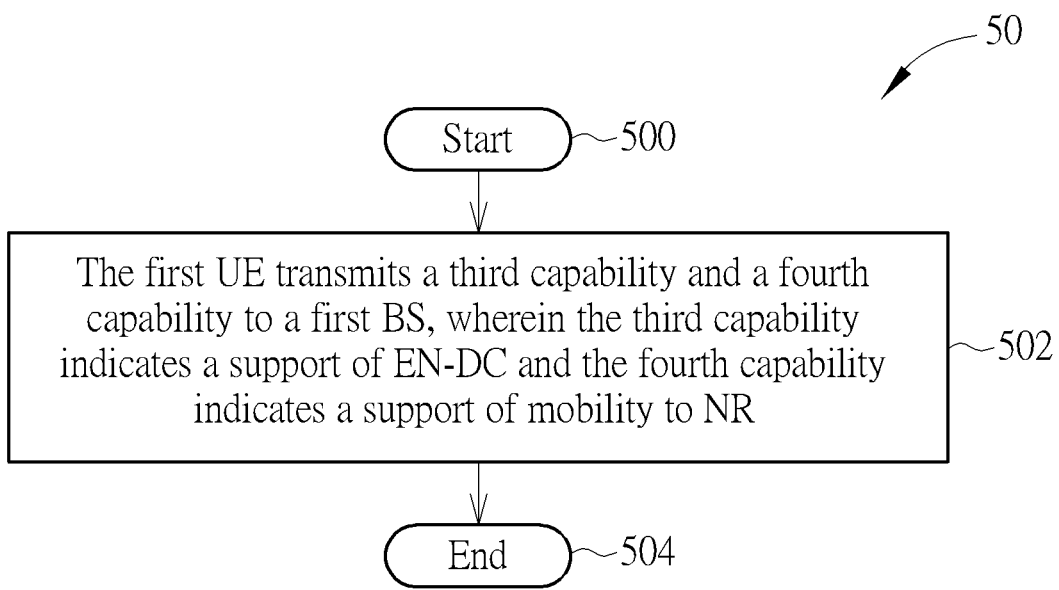
FIG. 5 is a flowchart of a process according to an example of the present invention.

A process 50 in FIG. 5 is utilized in a first UE for transmitting capabilities for mobility to a NR standalone network, and includes the following steps:

Step 500: Start.

Step 502: The first UE transmits a third capability and a fourth capability to a first BS, wherein the third capability indicates a support of EN-DC and the fourth capability indicates a support of mobility to NR.

Step 504: End.

Figure 6:
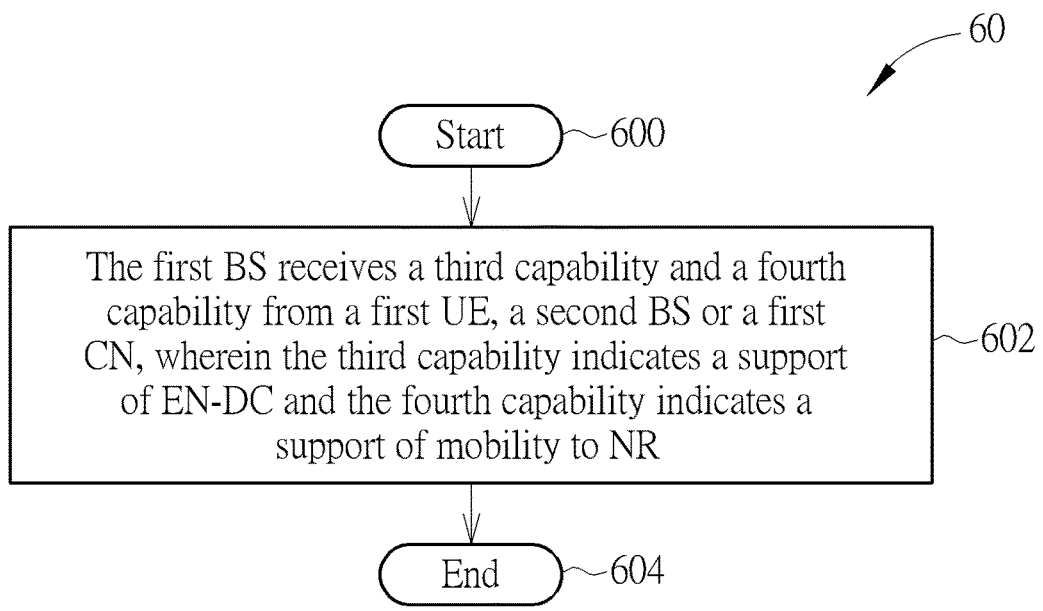
FIG. 6 is a flowchart of a process according to an example of the present invention.

A process 60 in FIG. 6 is utilized in a first BS (e.g., in the network in FIG. 1) and includes the following steps:

Step 600: Start.

Step 602: The first BS receives a third capability and a fourth capability from a first UE, a second BS or a first CN, wherein the third capability indicates a support of EN-DC and the fourth capability indicates a support of mobility to NR.

Step 604: End.

The following may be applied to the processes 30-60.

In one example, the first UE transmits a second capability indicating a plurality of supported bands (e.g., SupportedBandListNR-r15) to the first BS, in addition to the third capability and the fourth capability. In one example, the first UE transmits a fifth capability indicating a NR Packet Data Convergence Protocol (PDCP) capability (e.g., PDCP-ParametersNR-r15) to the first BS, in addition to the third capability and the fourth capability. The first UE may include at least one of the second capability, the third capability, the fourth capability and the fifth capability in an UE-EUTRA-Capability IE, and transmits the UE-EUTRA-Capability IE to the first BS.

In one example, the first BS may receive the second capability from the first UE, the second BS or the first CN, in addition to the third capability and the fourth capability. In one example, the first BS may receive the fifth capability from the first UE, the second BS or the first CN. The first BS may receive the UE-EUTRA-Capability IE including at least one of the second capability, the third capability, the fourth capability and the fifth capability from the first UE, the second BS or the first CN.

In one example, the first BS receives a UECapabilityInformation message including the UE-EUTRA-Capability IE from the first UE, the second BS or the first CN. The first BS may transmit a UECapabilityEnquiry message to request the first UE to transmit the UECapabilityInformation message.

In one example, the mobility to the NR includes at least one of a handover to a NR BS, camping on a NR cell and a redirection to a NR cell. The first BS may transmit a NR RRC message (e.g., on a signalling radio bearer (SRB)) to the first UE. The NR RRC message orders the first UE to handover to the NR BS from the first BS. In case the first BS is an eNB, the first BS may include the NR RRC message in a EUTRA (i.e., LTE) RRC message (e.g., a MobilityFromEUTRACommand message), and transmits the EUTRA RRC message to the first UE (e.g., on a EUTRA SRB). The first UE extracts the NR RRC message from the EUTRA RRC message, and performs the handover to the NR BS according to the NR RRC message. The first UE may perform a random access (RA) procedure with the NR BS according to RA configuration in the NR RRC message, and transmits a NR RRC response message to the NR BS (e.g., on a NR SRB) in response to the NR RRC message. The first UE may not encapsulate the NR RRC response message in a EUTRA RRC response message responding to the EUTRA RRC message.

In one example, the first UE transmits the fourth capability to the first BS, when the first UE is capable of the mobility to NR. The first UE may transmit the third capability to the first BS, when the first UE is capable of the EN-DC.

In one example, a second UE is capable of the EN-DC, but is not capable of the mobility to NR. Thus, the first BS may receive the third capability for the second UE from the second UE, a BS different from the first BS or the first CN and does not receive the fourth capability. In one example, a third UE is capable of the mobility to NR, but is not capable of the EN-DC. Thus, the first BS may receive the fourth capability for the third UE from the third UE, a BS different from the first BS or the first CN and does not receive the third capability for the third UE.

In one example, the first CN includes a MME or an AMF. In one example, the first BS is an eNB or a gNB, and the second BS is an eNB or a gNB. The eNB may connect to the first CN or the second CN.

In one example, the first BS (e.g., an eNB) determines to initiate a handover to a NR BS (e.g., a gNB) for the first UE or the third UE according to the fourth capability. The first BS transmits a Handover Required message to a second CN (e.g., MME) for the first UE or the third UE, in response to the determination or the initiation. The Handover Required message includes information related to the first UE or the third UE. The second CN transmits a first message (e.g., a Relocation Request message) including the information related to the first UE or the third UE to a third CN in response to the Handover Required message. The third CN transmits a first Handover Request message including all or some of the information related to the first UE or the third UE to the NR BS. The NR BS transmits a Handover Request Acknowledge message including the NR RRC message to the third CN in response to the first Handover Request message. The third CN transmits a second message including the NR RRC message to the second CN. Then, the first BS receives a Handover Command message including the NR RRC message from the second CN, in response to the Handover Required message. The first BS transmits the NR RRC message as described above. The first BS determines not to initiate the handover to a NR BS for the second UE since the first BS does not have the fourth capability for the second UE. That is, the first BS does not transmit a second Handover Request message to the NR BS for the second UE. The first BS may determine to initiate the handover to the NR BS for the first UE or the third UE according to a measurement report received from the first UE or the third UE in addition to the fourth capability. The measurement report may indicate that the NR cell or a NR carrier frequency of the NR BS has a good signal strength or a good signal quality. The first BS configures a measurement configuration configuring information identifying the NR carrier frequency (e.g., a NR band number or a NR channel number) to the first UE or the third UE. The first UE or the third UE performs measurements on the NR carrier frequency, and transmits the measurement report to the first BS according to the measurement configuration.

In one example, the information related to the first UE or the third UE includes the capabilities of the first UE in at least one of a UE-NR-Capability IE and NAS information. Some of the information related to the first UE or the third UE may include the UE-NR-Capability IE but does not include the NAS information. In one example, a UE-NR-Capability includes the second capability or the fifth capability. In one example, the UE-NR-Capability does not include the third capability and the fourth capability.

In one example, a UE-EUTRA-Capability also includes EUTRA capabilities (e.g., EUTRA band combinations for carrier aggregation) in addition to the capabilities described above.

In one example, the first BS (e.g., an eNB) determines to initiate a secondary node (SN) (e.g., SgNB) addition procedure with the NR BS (e.g., a gNB) to configure EN-DC to the first UE or the second UE according to the third capability. The first BS transmits a SN Addition Request message for the first UE or the second UE to the NR BS to perform the SN addition procedure. The SN Addition Request message may include a UE-MRDC-Capability IE and the UE-NR-Capability of the first UE or the UE-NR-Capability of the second UE. The NR BS transmits a SN Addition Request Acknowledge message to the first BS in response to the SN Addition Request message. The SN Addition Request Acknowledge message includes the NR RRC message configuring the first UE or the second UE to connect to the NR BS for the EN-DC. The NR BS may generate the NR RRC message according to the UE-NR-Capability IE or the UE-MRDC-Capability IE. The first BS transmits the NR RRC message (e.g., on a EUTRA SRB) to the first UE or the second UE. In one example, the first BS includes the NR RRC message in a EUTRA RRC message (e.g., a RRC Connection Reconfiguration message) and transmits the EUTRA RRC message to the first UE or the second UE.

In one example, the first UE or the second UE connects to the NR BS according to the NR RRC message while (or when) keeping connecting to the first BS. The first UE or the second UE communicates (e.g., transmits or receives) data with (e.g., to or from) the NR BS according to the NR RRC message. The first UE or the second UE transmits a NR RRC response message to the first BS (e.g., on the EUTRA SRB) in response to the NR RRC message. In one example, the first UE or the second UE includes the NR RRC response message in a EUTRA RRC response message (e.g., a RRC Connection Reconfiguration Complete message) and transmits the EUTRA RRC response message to the first BS.

In one example, the first BS (e.g., an eNB) may determine to initiate the SN (e.g., SgNB) addition procedure with the NR BS (e.g., a gNB) to configure the EN-DC to the first UE or the second UE according to a measurement report in addition to the third capability. The measurement report may indicate that the NR cell or the NR carrier frequency of the NR BS has a good signal strength or a good signal quality. The first BS configures a measurement configuration configuring information identifying the NR carrier frequency (e.g., a NR band number or a NR channel number) to the first UE or the second UE. The first UE or the second UE performs measurements on the NR carrier frequency and transmits the measurement report to the first BS according to the measurement configuration.

In one example, the first BS does not initiate the SN addition procedure for the third UE to configure the EN-DC since the first BS does not receive the third capability from the third UE.

In one example, the first BS determines to initiate a redirection to NR (e.g., a NR cell, a NR BS, a NR carrier frequency or a NR RAT) for the first UE or the third UE according to the fourth capability. The first BS transmits a EUTRA RRC message (e.g., RRCConnectionRelease) commanding the first UE or the third UE to enter an idle mode and selects a NR cell, in response to the determination or the initiation. The first UE or the third UE enters the idle mode (i.e., releasing the SRB with the first BS), and selects the NR cell in response to the ETURA RRC message. When the first UE or the third UE selects the NR cell, the first UE or the third UE may initiate a RRC connection establishment procedure with/via the NR cell. The first BS may determine a NR carrier frequency of the NR cell according to the second capability of the first UE or the third UE. That is, the ETURA RRC message may include information identifying the NR carrier frequency (e.g., a NR band number or a NR channel number). It should be noted that the first BS does not initiate any procedure with a NR BS for preparing the redirection for the first UE or the third UE. The first BS determines not to initiate a redirection to a NR BS for the second UE since the first BS does not have the fourth capability for the second UE, i.e., the first BS knows the second UE is not capable of the mobility to NR.

In one example, the first UE transmits the second capability and the fourth capability to the first BS. In one example, the first BS receives the second capability and the fourth capability from the first UE, the second BS or the first CN.

In one example, the NR RRC message is a RRC Reconfiguration message and the NR RRC response message is a RRC Reconfiguration Complete message.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention.

Those skilled in the art should readily make combinations, modifications and/or alterations on the abovementioned steps, description and examples. Some steps described above may not necessarily have to be used in the invention. Description above for different processes may be combined. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

The examples are described from the UE's perspective and should not restrict the scope of the invention. The examples can be easily amended to arrive at examples for a BS from the examples above. The 3GPP specifications mentioned above may be considered as part of the disclosure.

To sum up, the present invention provides a method and related communication device for handling mobility to a NR standalone Network from a network different from the NR. Thus, the problem for connections of the UE for the modes can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for transmitting capabilities for mobility to a network supporting a standalone mode of a first radio access technology (RAT), comprising:
   at least one storage device; and
   at least one processing circuit, coupled to the at least one storage device, wherein the at least one storage device stores, and the at least one processing circuit is configured to execute instructions of:
   transmitting a first capability of the first RAT and a second capability of the first RAT to a first base station (BS) of a second RAT via the second RAT, wherein the first capability indicates a support of a standalone mode of the first RAT and the second capability indicates a plurality of supported bands of the first RAT; and
   transmitting a third capability of the first RAT to the first BS of the second RAT, wherein the third capability indicates the communication device is capable of dual connectivity (DC) of the second RAT and the first RAT.

2. The communication device of claim 1, wherein the instructions further comprise:
   receiving a measurement configuration from the first BS, wherein the measurement configuration configures the communication device to measure a carrier frequency of the first RAT; and
   transmitting a measurement result of the carrier frequency to the first BS, after measuring the carrier frequency.

3. The communication device of claim 1, wherein the instructions further comprise:
   receiving a redirection command redirecting the communication device to the first RAT from the first BS, wherein the redirection command indicates the first RAT or a carrier frequency of the first RAT;
   disconnecting from the first BS in response to the redirection command; and
   selecting a cell of the first RAT according to the redirection command.

4. A first base station (BS) of a second radio access technology (RAT) for handling mobility to a second BS of a first RAT, comprising:
   at least one storage device; and
   at least one processing circuit, coupled to the at least one storage device, wherein the at least one storage device stores, and the at least one processing circuit is configured to execute instructions of:
   receiving a first capability of the first RAT and a second capability of the first RAT for a first communication device, wherein the first capability indicates a support of a standalone mode of the first RAT and the second capability indicates a plurality of supported bands of the first RAT;
   receiving a fourth capability and the second capability from the first communication device, the second BS or a CN, wherein the fourth capability indicates a support of mobility to New Radio (NR);

handing over or redirecting the first communication device to the second BS of the first RAT, in response to the first capability or the fourth capability; and determining to initiate a secondary node (SN) addition procedure with a NR BS to configure EUTRA-NR dual connectivity (EN-DC) to the first communication device or the second communication device according to a third capability, wherein the third capability indicates a support of the EN-DC.

5. The first BS of claim 4, wherein the instructions further comprise:

determining to hand over the first communication device to the second BS of the first RAT according to the first capability; and transmitting a handover command message to the first communication device in response to the determination.

6. The first BS of claim 4, wherein the instructions further comprise:

receiving the second capability for a second communication device but not receiving the first capability for the second communication device; and not handing over the second communication device to a third BS of the first RAT, according to the first capability.

7. A communication device for transmitting capabilities for mobility to a New Radio (NR) standalone network, comprising:

at least one storage device; and at least one processing circuit, coupled to the at least one storage device, wherein the at least one storage device stores, and the at least one processing circuit is configured to execute instructions of:

transmitting a first capability and a second capability to a first base station (BS), wherein the first capability indicates a support of EUTRA-NR dual connectivity (EN-DC) and the second capability indicates a support of mobility to NR; and transmitting a third capability indicating a support of a NR standalone mode to the first BS;

wherein the mobility to NR comprises a handover to a NR BS, camping on a NR cell and redirection to a NR cell.

8. The communication device of claim 7, wherein the instructions further comprise:

transmitting a fourth capability indicating at least one of a plurality of supported bands and a fifth capability indicating a NR Packet Data Convergence Protocol (PDCP) capability to the first BS.

9. The communication device of claim 7, wherein the instructions further comprise:

receiving a NR RRC message handing over the communication device to a NR BS from the first BS;

performing a handover to the NR BS according to the NR RRC message; and transmitting a NR RRC response message to the NR BS in response to the NR RRC message.

10. The communication device of claim 7, wherein the instructions further comprise:

receiving a NR RRC message configuring the communication device to connect to a NR BS for the EN-DC from the first BS;

connecting to the NR BS according to the NR RRC message; and transmitting a NR RRC response message to the first BS in response to the NR RRC message.

11. The communication device of claim 1, wherein the first RAT is a New Radio (NR) and the second RAT is an evolved Universal Terrestrial Radio Access (EUTRA).

12. The communication device of claim 4, wherein the first RAT is a NR and the second RAT is an evolved Universal Terrestrial Radio Access (EUTRA).

* * * * *